United States Patent
Morishima et al.

[11] Patent Number: 5,481,383
[45] Date of Patent: Jan. 2, 1996

[54] COLOR IMAGE READER

[75] Inventors: Hideki Morishima, Tokyo; Naosato Taniguchi, Machida, both of Japan

[73] Assignee: Canon Kabushiki Kaisha, Tokyo, Japan

[21] Appl. No.: 150,803

[22] Filed: Nov. 12, 1993

[30] Foreign Application Priority Data

Nov. 13, 1992 [JP] Japan ................................. 4-328836

[51] Int. Cl.$^6$ .......................... G02B 5/28; G02B 5/32; G03H 1/26; G01J 3/50
[52] U.S. Cl. .................. 359/15; 250/226; 359/22; 359/24; 359/590
[58] Field of Search ........................ 359/15, 22, 24, 359/563, 566, 589, 590; 250/226, 237 R, 237 G

[56] References Cited

U.S. PATENT DOCUMENTS

| | | | |
|---|---|---|---|
| 3,681,519 | 8/1972 | Larsen et al. | 359/563 |
| 4,882,619 | 11/1989 | Hasegawa et al. | 359/615 |
| 5,011,244 | 4/1991 | Smith et al. | 359/22 |
| 5,026,131 | 6/1991 | Jannson et al. | 359/15 |
| 5,267,060 | 11/1993 | Colton | 359/15 |
| 5,272,551 | 12/1993 | Lehoreau et al. | 359/24 |

FOREIGN PATENT DOCUMENTS

| | | | |
|---|---|---|---|
| 62-234106 | 10/1987 | Japan . | |
| 2-257116 | 10/1990 | Japan | 359/15 |
| 3181269 | 8/1991 | Japan . | |

OTHER PUBLICATIONS

The Bell System Technical Journal "Coupled Wave Theory For Thick Hologram Gratings" H. Kogelnik, vol. 48, No. 9, Nov. 1969, pp. 2909–2947.

Primary Examiner—Martin Lerner
Attorney, Agent, or Firm—Fitzpatrick, Cella, Harper & Scinto

[57] ABSTRACT

A color image reading apparatus includes a multiple-line sensor in which a plurality of one-dimensional sensor arrays are arranged on a single substrate, a projection optical system for projecting a subject on the sensor, and a color separator disposed in an optical path between the projection optical system and the sensor, for color-separating light from the subject into a plurality of color beams. The color separator includes a volume hologram and an optical interference film.

16 Claims, 6 Drawing Sheets

COLOR IMAGE READER

BACKGROUND OF THE INVENTION

1. Field of the Invention

The present invention relates to a color image reading apparatus. More particularly, the invention relates to a color image reading apparatus suitable for color scanners, color facsimile devices, or the like, which can read information of color image on manuscript at high precision, making use of color separation means comprised of a volume hologram and an optical interference film, and reading means in which three line sensors are provided on a single substrate.

2. Related Background Art

There have been proposed various reading apparatus in which color image information on manuscript is guided through an optical system to form images thereof on line sensors such as CCD and the color image information is digitally read using output signals from the line sensors.

Figure 1:
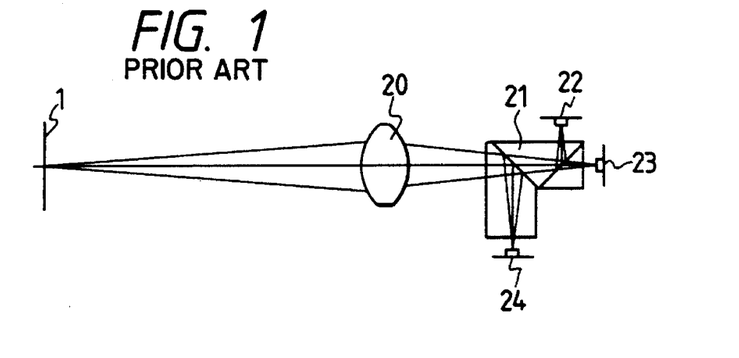
FIG. 1 is a schematic drawing to show the major part of a conventional color image reading apparatus.

For example, FIG. 1 is a schematic drawing of a conventional color image reading apparatus. In FIG. 1, a beam from color image on manuscript 1 is converged by an image-forming lens 20; in forming images on line sensors described below the beam is guided through a 3P prism 21 to be color separated into three colors, for example red (R), green (G) and blue (B); and the thus separated color beams are guided onto line sensors 22, 23, 24 each composed of CCD for example. Each color image formed on line sensor 22, 23, 24 is line-scanned to effect reading for each color light.

Figure 2:
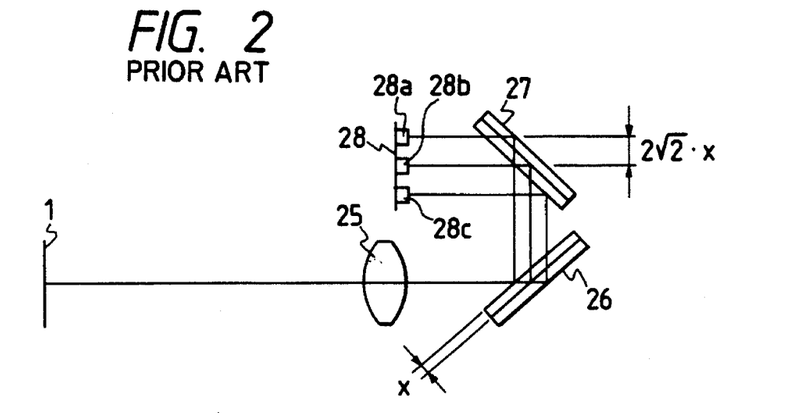
FIG. 2 is a schematic drawing to show the major part of another conventional color image reading apparatus.

FIG. 2 is a schematic drawing to show the major part of a color image reading apparatus proposed in Japanese Laid-open Patent Application No. 62-234106.

Figure 3:
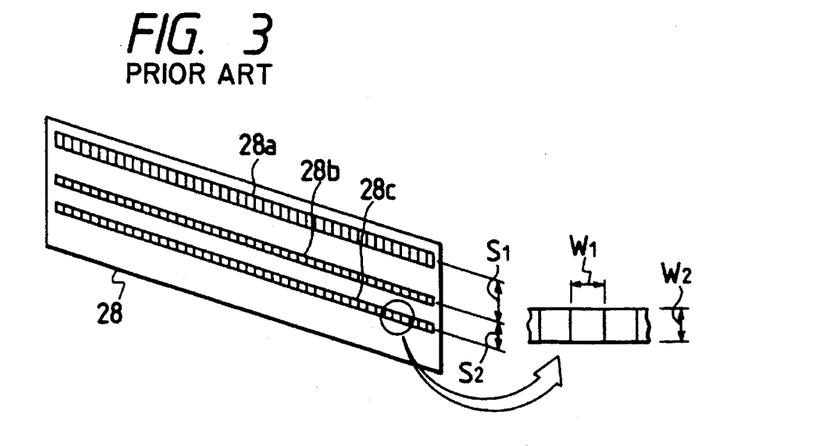
FIG. 3 is an explanatory drawing to illustrate a monolithic 3-line sensor.

In FIG. 2, a beam from color image on manuscript 1 is converged by an image-forming lens 25 and in forming images on line sensors described below, the beam is separated into three beams corresponding to the three colors through two beam splitters 26, 27 for color separation with selective transmission films having dichroism. Color images based on the three color light beams are formed on respective line sensors in so-called monolithic 3-line sensor 28, in which three line sensors 28a, 28b, 28c are provided on a single substrate as shown in FIG. 3. This enables reading of each color light with line scan on the color image. In the arrangement shown in FIG. 3, distance $S_1$ or $S_2$ between line sensors is about 0.1 to 0.2 mm, and the size of each unit sensor element W1×W2 is about 7 μm×7 μm or 10 μm×10 μm.

The color image reading apparatus shown in FIG. 1 needs the three independent line sensors, must be made at high precision, and requires the 3P prism which is difficult to produce, which caused the following problems. The entire apparatus becomes complicated and expensive. Further, assembly adjustment is troublesome, because three independent aligning adjustments are necessary between the image-forming beams and the line sensors.

Supposing the thickness of beam splitter 26, 27 is X in the color image reading apparatus shown in FIG. 2, the distance between two lines of line sensors is $2\sqrt{2}X$.

If a preferable distance is about 0.1 to 0.2 mm between the lines of line sensors in respect of production, the thickness X of beam splitter 26, 27 should be about 35 to 70 μm.

Generally, it is very difficult to make such a thin beam splitter as keeping excellent optical planeness. Thus, if such thin beam splitters were used, the optical property of color images formed on line sensors would be degraded.

Figure 4A:
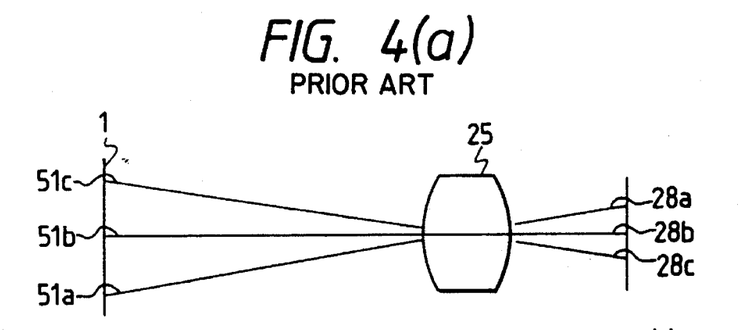
FIG. 4 is a schematic drawing to show the major part of a conventional color image reading apparatus.
Figure 4B:
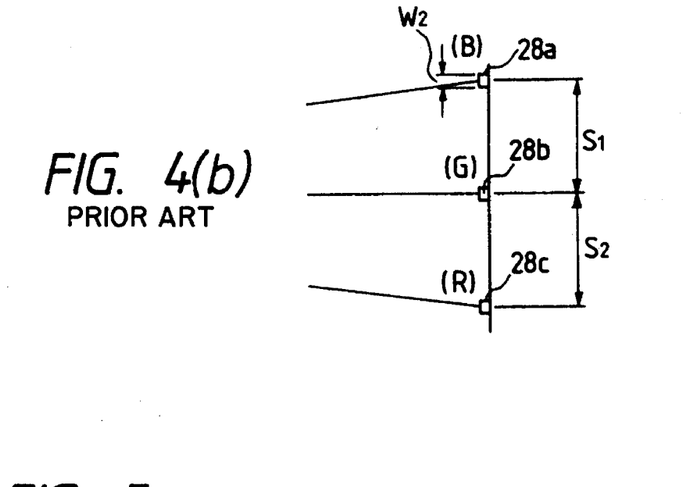

Meanwhile, it is generally normal that the two line sensors 28a, 28c are separated at equal distance on either side of the central line sensor 28b in the monolithic 3-line sensor and that the distance between the central line sensor 28b and either one of the other line sensors 28a, 28c is an integral multiple of pixel size in the sub-scanning direction (W2 in FIG. 3). The reason is as follows. As seen from FIG. 4, in case that an image is read by the above monolithic 3-line sensor, using only a normal image-forming lens 25, three different positions 51a, 51b, 51c are simultaneously read on the manuscript by the three line sensors 28a, 28b, 28c, as shown in FIG. 4. Therefore, three signal components of three color light (R, G, B) cannot be simultaneously read at a certain position. Three components must be set together to be combined with each other after all components are read.

To realize it, the distance $S_1$, $S_2$ between line sensors is set to an integral multiple of each pixel size W2 and redundant line memories are provided corresponding to the integral multiple. Then G signal and R signal are delayed relative to B signal for example, relatively easily to obtain a combined signal of three colors. This is the reason for the above integral multiple. However, a drawback is that a plurality of expensive line memories must be provided as the redundant line memories corresponding to the distance between lines.

SUMMARY OF THE INVENTION

It is an object of the present invention to provide a color image reading apparatus using a volume hologram and an optical interference film as color separation means, which is simplified in total by properly constructing an image-forming optical system and the color separation means and which can digitally read a color image at high precision with three color light beams for example of R, G and B.

A color image reading apparatus of the present invention is characterized in that a color image is guided through an image-forming optical system onto reading means in which three line sensors are arranged in parallel with each other on a single substrate, that color separation means comprising a volume hologram and an optical interference film is provided in an optical path between an exit pupil of the image-forming optical system and the reading means to color-separate an incident beam into three color beams in the direction perpendicular to the arrangement direction of the three line sensors in reading the color image by the reading means, and that the color images based on the color light beams color-separated by the color separation means are read by the reading means.

Specifically in the present invention, the optical interference film is provided on a cover glass, which is bonded to the volume hologram; the color separation means color-separates the incident beam into three color light beams of red light, green light and blue light; the green light and the blue light are separated by diffraction effect of the volume hologram; and the red light is separated by the optical interference film.

DETAILED DESCRIPTION OF THE PREFERRED EMBODIMENTS

Figure 5:
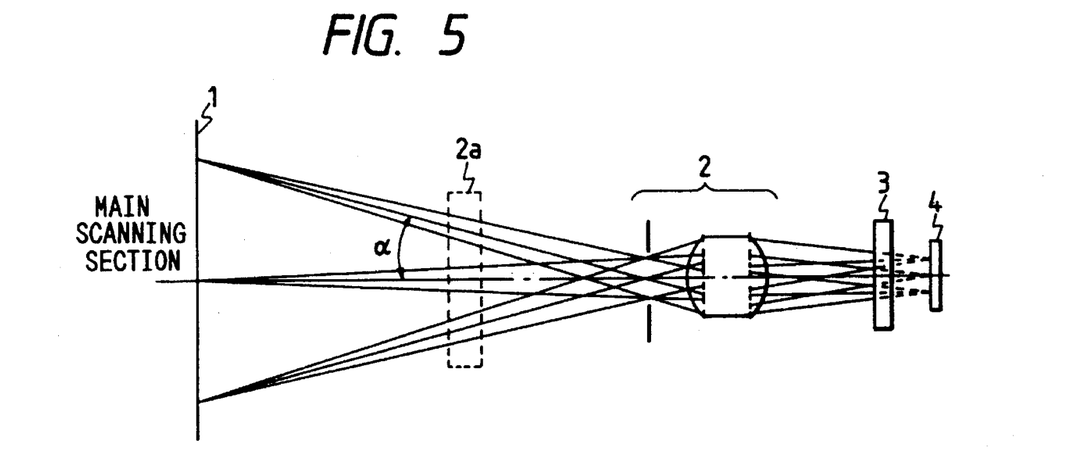
FIG. 5 is a plan view to show the major part of a first embodiment of color image reading apparatus according to the present invention.
Figure 6:
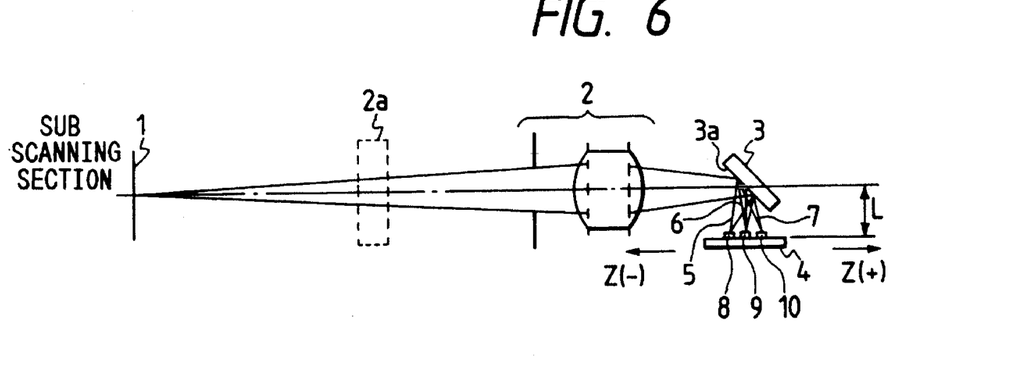
FIG. 6 is a side view to show the major part of the first embodiment of color image reading apparatus according to the present invention.
Figure 7:
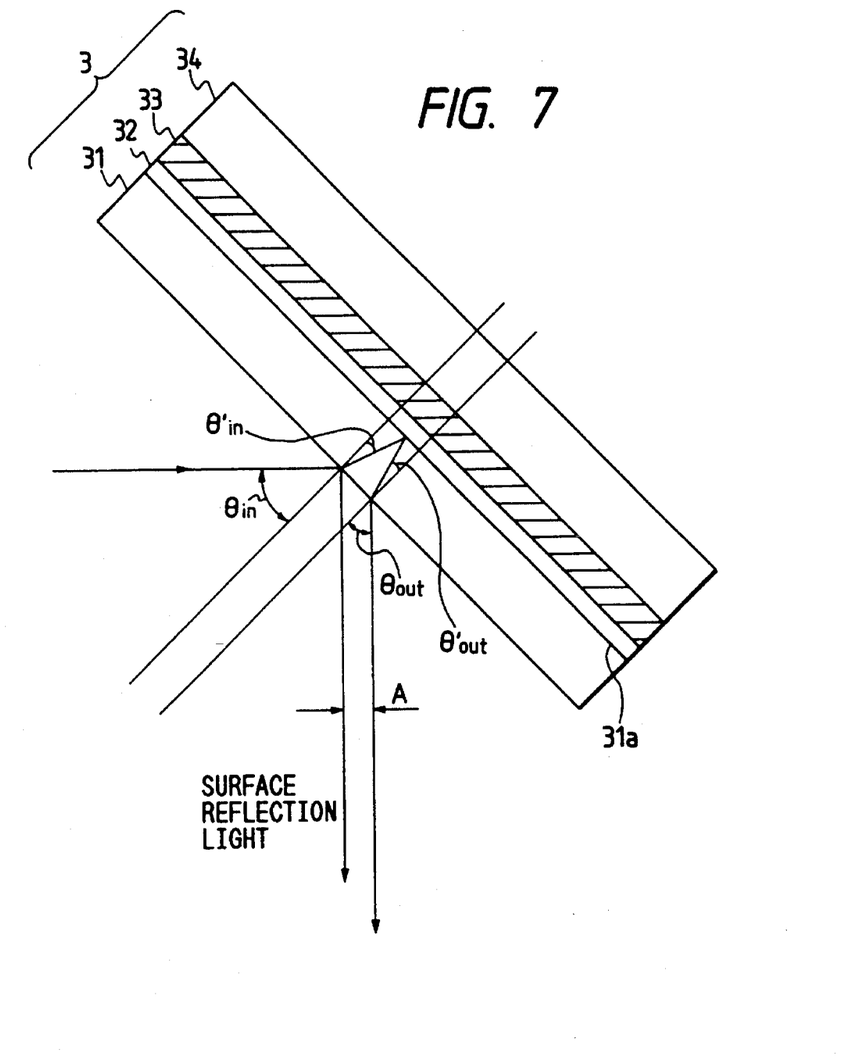
FIG. 7 is an explanatory drawing to show a part of FIG. 5.

FIG. 5 and FIG. 6 are a plan view (cross section along the main scanning direction) and a side view (cross section along the sub-scanning direction perpendicular to the main scan cross section and including the optical axis), respectively, to show the major part of the first embodiment of color image reading apparatus according to the present invention and FIG. 7 is an enlarged view to illustrate a part of FIG. 5.

In the drawings, reference numeral 1 designates a surface of manuscript as object, on which a color image is formed. Numeral 2 designates an image-forming optical system, which is constituted for example as a so-called exit-side telecentric system from which the principal ray is outgoing in parallel with the optical axis on the exit side. Numeral 3 denotes color separation means, which is composed of a volume hologram and an optical interference film as detailed later and which separates an incident beam into three color light beams, for example into red light (R light) 5, green light (G light) 6 and blue light (B light) 7 while reflecting the light. Numeral 4 represents reading means, which is comprised of a monolithic 3-line sensor in which three line sensors 8, 9, 10 with a plurality of pixels being aligned in one direction are arranged such that the three lines of pixels are parallel to each other on a single substrate.

As described, the reading means 4 is a line sensor in which a plurality of one-dimensional sensor arrays are set on a single substrate as being separate at finite distance from each other in the direction perpendicular to the sensor array direction. Each line sensor 8, 9, 10 on the reading means 4 extends in the main scanning direction (in the direction normal to the sheet plane of FIG. 6).

In the present embodiment the manuscript 1 is illuminated by an unrepresented illumination system and a color image on the manuscript 1 is linearly scanned by scanning means 2a in the sub-scanning direction (vertically on the plane of FIG. 6). The beam from the color image is guided through the image-forming optical system 2 to the color separation means 3, where the beam is separated into three beams of predetermined colors in the sub-scanning direction perpendicular to the array direction of the sensor arrays. The thus separated color images are formed on corresponding line sensors 8, 9, 10. The color images based on the respective color beams are digitally read by the reading means 4.

In other words, the image information on the manuscript 1 is read by moving the manuscript 1 relative to the color image reading portion (image-forming optical system 2, color separation means 3 and reading means 4) in the sub-scanning direction.

Next described with FIG. 7 are features of the color separation means 3 in the present embodiment.

In FIG. 7 numeral 3 denotes the color separation means. Numeral 33 is a volume hologram, which separates green light and blue light from each other by reflection diffraction. Now let P be a grating surface pitch of the hologram 33.

Numeral 31 denotes a cover glass, on which an optical interference film 31a is vapor-deposited on the side of hologram 33. The optical interference film 31a reflects only red light. The optical interference film 31a is for example a dichroic mirror film with center wavelength of 610 nm and half-width of 30 nm. Numeral 32 denotes an adhesive layer, which bonds the cover glass 31 to the volume hologram 33. The volume hologram 33 is produced by double exposure in a hologram material on a single substrate. Each exposure records interference fringes to satisfy the Bragg diffraction condition for the principal wavelength of green light or blue light. Numeral 34 designates a substrate, which supports the hologram 33.

Next described are specific parameters for the volume hologram 33 and the optical interference film 31a in the present embodiment.

First considered is influence of provision of cover glass 31 on parameters. Let $n_\lambda$ be an index of refraction of the cover glass 31 for an arbitrary wavelength $\lambda$. Then there is the following relation between angles $\theta'_{in}$, $\theta'_{out}$ incident into or outgoing from the volume hologram 33 through the cover glass 31 and angles $\theta_{in}$, $\theta_{out}$ incident into or outgoing from the cover glass 31.

$$\sin \theta_{in} = n_\lambda \sin \theta'_{in}$$

$$\sin \theta_{out} = n_\lambda \sin \theta'_{out}$$

Also, the following relation holds for the grating surface pitch P of hologram 33 and the angles $\theta'_{in}$ and $\theta'_{out}$.

$$n_\lambda P(\sin \theta'_{in} - \sin \theta'_{out}) = \lambda$$

Arranging the above relation, $$P(n_\lambda \sin \theta'_{in} - n_\lambda \sin \theta'_{out}) = \lambda.$$

Using the above relation for $\lambda$ between angle $\theta_{in}$, $\theta_{out}$ and angle $\theta'_{in}$, $\theta'_{out}$, $$P(\sin \theta_{in} - \sin \theta_{out}) = \lambda.$$

The thus obtained relation is nothing but the relation for a case without the cover glass 31 between parameter P and incident and outgoing angles $\theta_{in}$, $\theta_{out}$. Accordingly, the following discussion ignores the existence of cover glass 31 in determining the parameters.

Here, let L (L=35 mm) be a distance from the hologram grating surface 3a to the monolithic 3-line sensor surface 4, $\theta_{in}$ ($\theta_{in}$=45°) be the incident angle into the hologram grating surface 3, P be a grating surface pitch of produced hologram grating 3, $\phi'$ be a grating inclination angle in hologram, and d be a grating spacing.

Further, $Z_G$, $Z_B$ ($Z_G = Z_B = 100$ μm) be the distances between line sensors (distance between line sensors 8 and 9 and distance between line sensors 9 and 10). The center wavelengths $\lambda_R$, $\lambda_G$, $\lambda_B$ of the three color light beams to be separated are $\lambda_R = 610$ nm, $\lambda_G = 530$ nm, and $\lambda_B = 470$ nm. In this example, the R component beam 6 is regularly reflected by the wavelength-selective reflection film such as a band pass filter, as described above.

Incidentally, obtaining the grating pitches of diffraction gratings, the center wavelengths, and the distance between the hologram 33 and the line sensors 4 results in obtaining a desired separation distance.

Then it in turn results in obtaining necessary angles of diffraction (angles of reflection-diffraction in the present embodiment). Namely, $$Z_B = L \cdot \tan \lambda_B;$$

similarly, $$Z_G = L \cdot \tan \lambda_G.$$

Here $\lambda_B$ or $\lambda_G$ represents a reflection-diffraction angle as a difference from the direction of regularly reflected light. If $Z_B = +0.1$ mm, $Z_G = -0.1$ mm and $L = 35$ mm, then $\lambda_B = +0.1637°$ and $\lambda_G = -0.1637°$.
Thus, the diffraction angles of outgoing B light and G light for the incident angle $\theta_{in} = 45°$ are as follows.

$$\theta_{out,B} = 45.1637° \text{ and } \theta_{out,G} = 44.8363°.$$

Incidentally, the outgoing diffraction angle $\theta_{out,R} = 45°$.

The above determines the aforementioned parameters P, $\phi'$, d necessary for the wavelengths $\lambda_B$, $\lambda_G$. Namely, from $$P_B = \frac{\lambda_B}{\sin\theta_{out,B} - \sin\theta_{in}},$$

$$PB = 232.972 \text{ μm};$$

from $$\phi_B' = \frac{\theta_{out,B}' - \theta_{in}'}{2},$$

$$\phi_B' = 0.0437°;$$

where $$\theta_{out}' = \sin^{-1}\left(\frac{\sin\theta_{out}}{n}\right)$$

and the angle $\theta_{in}'$ is also defined in the same manner as above, in which n is an index of refraction of the hologram photosensitive material, for example n=1.5.

The grating spacing d is determined from $d_B = P_B \cdot \sin \phi_B'$, as $$d_B = 0.1777 \text{ μm}.$$

By the same calculations for the wavelength $\lambda_G$, $$P_G = -261.963 \text{ μm}$$

(the minus sign is only for discrimination of angle but has no physical meaning;)

$$\phi_G' = -0.0438°;$$

$$d_G = 0.2002 \text{ μm}.$$

Figure 8:
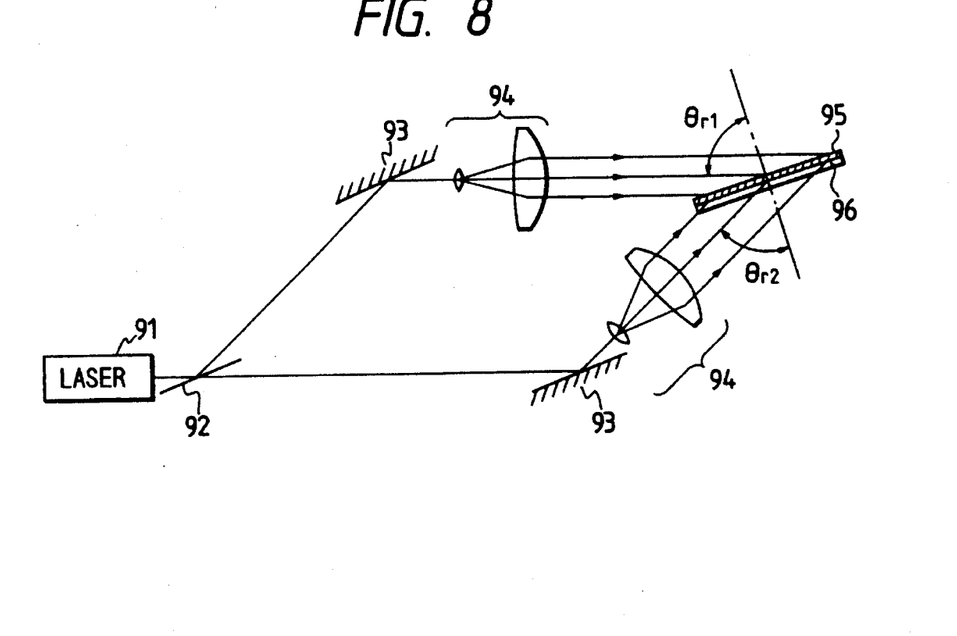
FIG. 8 is a schematic drawing of the major part to illustrate the method for producing a volume hologram according to the present invention.

Next described are the conditions based on the exposure recording method with laser beam in producing the hologram with the above parameters. FIG. 8 is a schematic drawing to show an exposure apparatus in the present embodiment.

In FIG. 8, coherent light is emitted from a laser 91 such as Ar laser and is split into two coherent beams by a half mirror 92. The two coherent beams thus split are bent by a mirror 93 and collimated by a collimator lens system 94. The collimated beams enter the hologram photosensitive material 95 coated or bonded onto a support 96 such as a glass substrate at respective incident angles $\theta_{r1}$, $\theta_{r2}$ as being opposed to each other (from the front and from the back, respectively). Various photosensitive materials may be employed as the hologram material, for example bichromate gelatin, poly-N-vinylcarbazole, or photopolymers.

The incident angles $\theta_{r1}$, $\theta_{r2}$ of the hologram recording beams are next described.

Consider that the laser beam in recording is an Ar laser with $\lambda_r = 0.5145$ μm for example. Applying the Bragg diffraction condition in diffraction to each of wavelengths $\lambda_B$, $\lambda_G$, $$\lambda_r = 2 \times n \times d \times \cos(\theta_r' \pm \phi').$$

From this relation, setting n=1.5, d→$d_B$, $d_G$, $\phi'$→$\phi_B'$, $\phi_G'$, the incident angle $\theta_r$ for the recording exposure system is determined ($\theta_r'$ is a recording angle in hologram and $\theta_r = \sin^{-1}(n \cdot \sin \theta_r')$). Using the aforementioned parameters $\phi'$, d,
$\theta_{r,G}' = 31.1208°$ and $31.0332° \to \theta_{r,G} = 50.8291°$ and $50.6513°$;
$\theta_{r,B}' = 15.2422°$ and $15.1548° \to \theta_{r,B} = 23.2254°$ and $23.0878°$.

Next described is mounting of the volume hologram with color separation function attained as described above. For example, suppose the incident angle $\theta_{in} = 45°$ includes an error for some reason. The error of incident angle can be absorbed with little degradation of performance by moving the monolithic 3-line sensor in the direction of optical axis (in the direction of L) and in the direction normal to the optical axis (in the direction of Z), because the change of diffraction angle is very small with fine shift of peak wavelength $\lambda_B$, $\lambda_G$ of B or G component beam.

There exists the following relation between the incident angle $\theta_{in}$ and the wavelength satisfying the Bragg diffraction condition in use of hologram, that is, the peak wavelength $\lambda_P$.

$$\lambda_P = 2 \times n \times d \times \cos(\theta_{in}' - \phi)$$

Each peak wavelength $\lambda_{P,B}$, $\lambda_{P,G}$ can be obtained by changing the incident angle $\theta_{in}$ as putting the parameters n, d, $\phi$ for B component beam or G component beam into the relation. In the actual arrangement of apparatus, an error of about ±0.5° in incident angle $\theta_{in}$ can be readily achieved. With the thus obtained wavelength $\lambda_{P,B}$, $\lambda_{P,G}$ and the grating pitch $P_B$, $P_G$, the outgoing diffraction angle $\theta_{out}$ may be obtained from the following relation.

$$\sin \theta_{out} = \sin \theta_{in} + \lambda_P / P$$

For reference, Table 1 shows outgoing diffraction angles $\theta_{out}$ and deviation angles ($\theta_{out} - \theta_{in}$) from the direction of regular reflection, obtained with parameters $\lambda_{P,B}$, $P_B$ and $\lambda_{P,G}$, $P_G$ and $\theta_{in} = 45 \pm 0.5°$.

TABLE 1

| (G Component beam) | | | |
|---|---|---|---|
| $\theta_{in}$ | $\lambda_{P,G}$ | $\theta_{out,G}$ | $\theta_{out,G} - \theta_{in}$ |
| 44.5° | 531.317 nm | 44.8359° | −0.1641° |
| 45° (designed angle) | 530.0 nm | 44.8363° | −0.1637° |
| 45.5° | 528.679 nm | 44.8367° | −0.1633° |

| (B Component beam) | | | |
|---|---|---|---|
| $\theta_{in}$ | $\lambda_{P,G}$ | $\theta_{out,B}$ | $\theta_{out,B} - \theta_{in}$ |
| 44.5° | 471.172 nm | 45.1641° | +0.1641° |
| 45° (designed angle) | 470.0 nm | 45.1637° | +0.1637° |
| 45.5° | 468.825 nm | 45.1633° | +0.1633° |

If the distance L between the hologram and the line sensors is shortened by −0.087 mm from 35 mm at the incident angle $\theta_{in}=44.5°$, $$Z_G = L \cdot \tan(\theta_{out,G} - \theta_{in}) = -0.1 \text{ mm; and}$$

$$Z_B L \cdot \tan(\theta_{out,B} - \theta_{in}) = 0.1 \text{ mm from Table 1.}$$

Thus the peak wavelengths can be separated as located at the center of line sensors. In this case, the entire monolithic 3-line sensor must be shifted by $$\Delta Z = L \cdot \tan(\theta_{in} - 45°) = -0.305 \text{ mm.}$$

Since the deviation of wavelength $\lambda_{P,B}$, $\lambda_{P,G}$ from the designed value is slightly over 1 nm, there is no practical problem caused. The same consideration is made for the incident angle $\theta_{in}=45.5°$. If the distance L is lengthened by +0.087 mm, the spectral separation is correctly done at $Z=\pm 0.1$ mm and the wavelength shift is about −1 or slightly more nm. Then correct spectral separation can be done by shifting the entire sensor by $\Delta Z=+0.306$ mm.

As described above, the error of incident angle of about ±0.5° causes little negative influence in the present embodiment.

Figure 9:
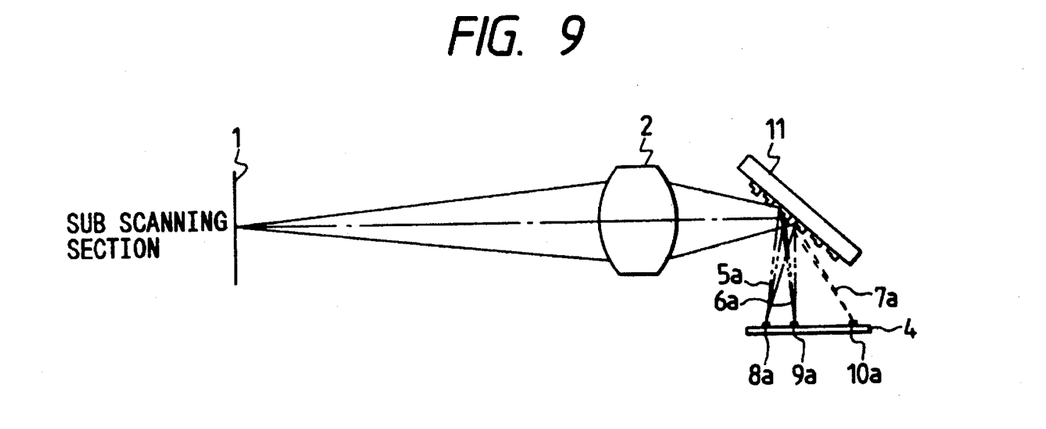
FIG. 9 is a schematic drawing to show the major part of a color image reading apparatus as previously proposed by Applicant.

There is proposed, for example, in Japanese Laid-open Patent Application No. 3-181269 a color image reading apparatus using a one-dimensional, stepwise, blazed diffraction grating 11 as shown in FIG. 9, which has the same operation of spectral separation. If the error of incident angle is ±0.5° in that case, the shift of peak wavelength is about 5 nm.

The shift of peak wavelength should be of course as small as possible to improve reading precision of color image in the color image reading apparatus as described above.

Next described is the diffraction efficiency of hologram in the present embodiment. The diffraction efficiency η can be calculated by the following equation, assuming the holographic grating surface of efficiency η can be calculated by the following equation, and assuming the holographic grating surface is substantially parallel to the film surface. (Bell Syst. Tech. J. vol 48 (1969)2909)

$$\eta = \left[ \frac{1 - \xi^2/v^2}{\sinh^2(v^2 - \xi^2)^{1/2}} + 1 \right]^{-1}$$

Here $$v = \frac{\pi \times \Delta n \times t_G}{\lambda \times \cos\theta_{in}'} ; \xi = \frac{2\pi \times n \times \Delta\lambda \times t_G}{\lambda^2 \times \cos\theta_{in}'}$$

where Δn: degree of modulation of refraction index;
$t_g$: film thickness;
λ: Bragg wavelength (peak wavelength);
Δλ: shift amount from Bragg wavelength;
n: average refraction index of hologram;
$\theta_{in}'$: incident angle in hologram.

The diffraction efficiency for the peak wavelength (Bragg wavelength) is obtained as follows, using ξ=0 because Δλ=0.

$$\eta_{max} = \tanh^2\left( \frac{\pi \times \Delta n \times t_G}{\lambda \times \cos\theta_{in}'} \right)$$

At mesial magnitude, that is, when the efficiency is $\eta_{max}/2$, $v^2 - \xi^2 < 0$. Then $$\eta_{mesial} = \left[ 1 + \frac{\xi^2 - v^2}{v^2 \sin^2(\xi^2 - v^2)^{1/2}} \right]^{-1}.$$

Using actual parameters, the values are obtained as follows.

$t_G = 10 \text{ μm}$ $\theta_{in}' = \sin^{-1}(\sin\theta_{in}/n) = -28.1255°$ ($\theta_{in}=45°$, $n=1.5$)

If Δn=0.03 then $\eta_{max}=0.931$ at $\lambda_G=530$ nm. In this case, the shift amount $\Delta\lambda=\pm 7.4$ nm providing $\eta_{mesial}$, and therefore the half wavelength width is only 14.8 nm. This is the case for wavelength $\lambda_B$.

In case that the aforementioned, one-dimensional, blazed diffraction grating is used, the efficiency $\lambda_{max}$ is 1.0 for zeroth order light but about 0.6 to 0.7 for ±first order diffracted light.

Figure 10:
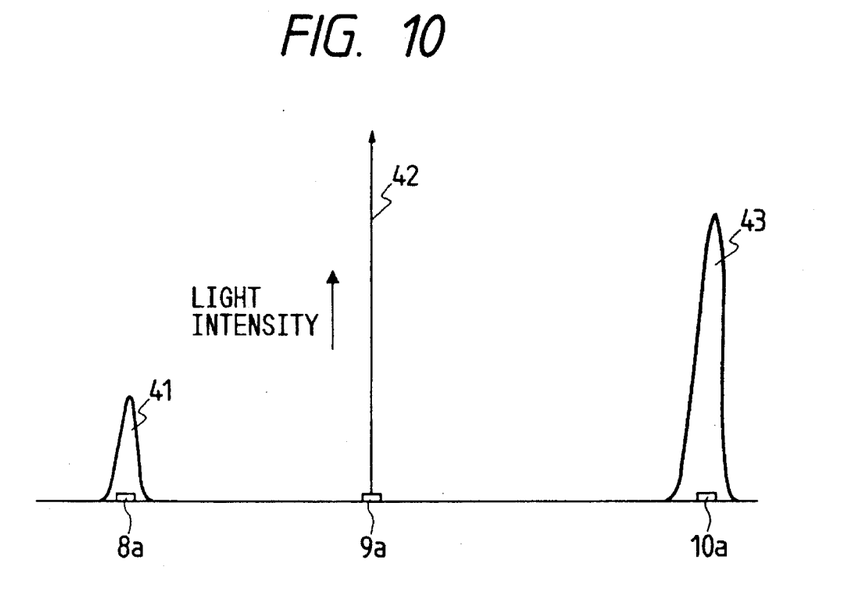
FIG. 10 is an explanatory drawing to illustrate spectral separation in use of a blazed diffraction grating.

Further, the half wavelength width is about 30 to 50 nm in that case. FIG. 10 is a schematic drawing to show light intensity of three color beams separated by diffraction using the blazed diffraction grating.

In FIG. 10, −1st light component (B component beam) 41 is guided onto a line sensor 8a for B component to form an image thereon and +1st light component (R component beam) 43 is guided onto a line sensor 10a for R component to form an image thereon. Unsharpness is seen in proportion with wavelength width in the sheet plane. Incidentally, the zeroth order light component (G component beam) 42 has no dispersion in diffraction, theoretically causing no unsharpness.

Next described with FIG. 7 is specific influence caused by the cover glass 31 attached to the volume hologram 33.

A part (several percents) of beam incident into the cover glass 31 is reflected by the surface of cover glass 31. The surface reflection light is parallel to the principal ray of red beam, and a spacing A therebetween is expressed by the following equation with the thickness t of cover glass 31, the refraction index $n_{cover}$, and the incident angle $\theta_{in}$.

$$A = 2 \times \tan\left( \sin^{-1}\left( \frac{\sin\theta_{in}}{n_{cover}} \right) \right) \times t \times \cos\theta_{in}$$

If $\theta_{in}=45°$ and $n_{cover}=1.5$ then $A=0.756xt$. For example, if the thickness $t=1$ mm then the reflected image is formed on the line sensor 4 at a position 0.75 mm apart from the line sensor 6 for red color beam, entering no line sensor for green, red or blue.

Bonding the cover glass 31 to the volume hologram 33 as described above can protect the hologram material, which generally has lower mechanical strength and lower moisture resistance than glass.

Figure 11:
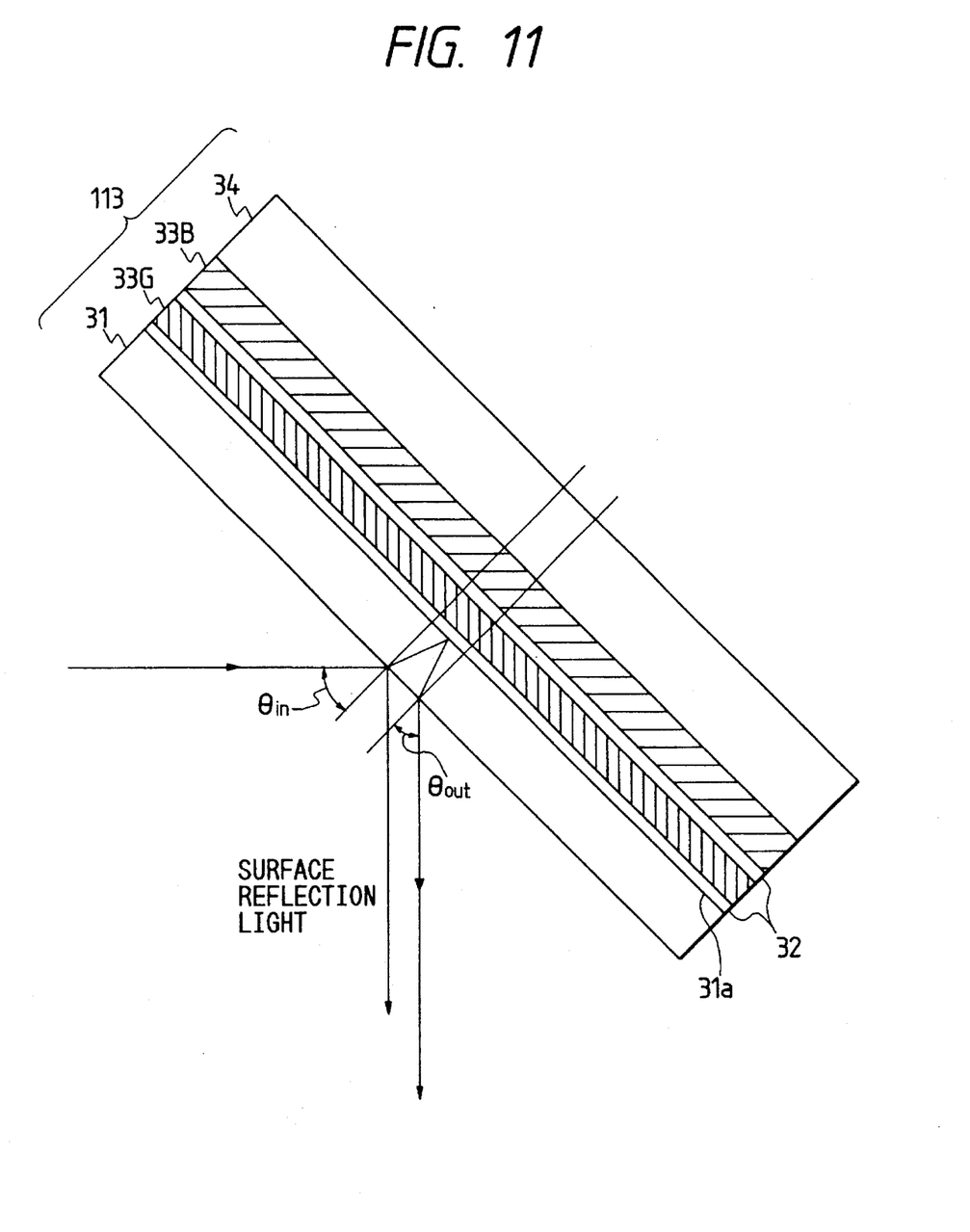
FIG. 11 is a schematic drawing to show the major part of a second embodiment of color separation means according to the present invention.

FIG. 11 is a schematic drawing to show the major part of the second embodiment of color separation means 113 according to the present invention. In FIG. 11, the same elements as those in FIG. 7 are denoted by the same reference numerals.

In FIG. 11, 33G and 33B are volume holograms in which interference fringes are recorded satisfying the Bragg diffraction condition for green light (principal wavelength $\lambda_G=530$ nm) and for blue light (principal wavelength $\lambda_B=470$ nm), respectively. The specific parameters are the same as those in recording the interference fringes for each of green light and blue light in the first embodiment.

Each of the volume holograms 33G, 33B is produced by a single exposure process. The volume holograms 33G, 33B are bonded to each other by an adhesive layer 32.

Figure 12:
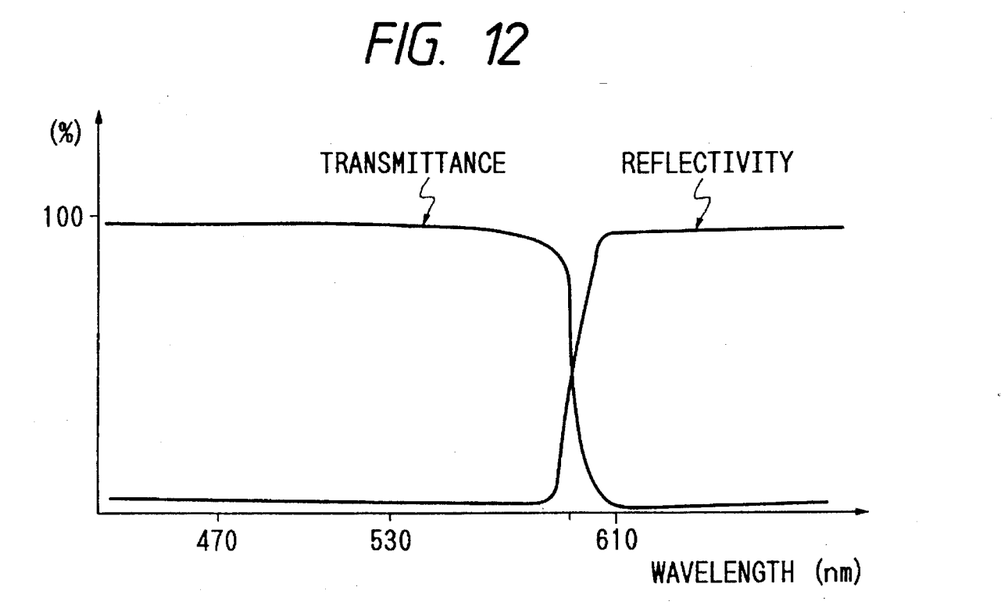
FIG. 12 is an explanatory drawing to illustrate spectral characteristics of an optical interference film in FIG. 11.

FIG. 12 is a spectral diagram to show spectral reflectivity and spectral transmission of the optical interference film 31a attached to the cover glass 31.

A beam incident into color separation means 113 reaches the optical interference film 31a attached to the cover glass 31 on the side of hologram 33G, so that red light is reflected and guided to the line sensor shown in FIG. 6. Green light among the light passing through the optical interference film 31a is diffracted by the volume hologram 33G for green light then to pass through the cover glass 31 and to reach the line sensor 8 shown in FIG. 6. The other color light passes through the volume hologram 33G. The blue light among the passing light is diffracted by the volume hologram 33B for blue light then to pass through the green light volume hologram 33G and the cover glass 31 and to reach the line sensor 10 shown in FIG. 6.

The volume holograms have such a feature that light of wavelengths not satisfying the Bragg condition passes therethrough without being influenced. Therefore, a light quantity of blue light is scarcely decreased in passing through the green light volume hologram 33G.

Since the holograms for green light and for blue light are produced in separate exposure processes, the production is made further easier than that of the volume hologram produced by double exposure in the first embodiment. Also, since the volume holograms are separately produced and bonded to each other, the yield can be improved.

The optical thin film 31a for reflection of red light is preliminarily applied by coating on the glass substrate 31. Then the hologram photosensitive material layer is applied thereon by coating. In the layer, holograms are recorded and developed, whereby the cover glass 31 and the volume hologram 33G are obtained. The hologram photosensitive material may be one which can be produced by coating, dipping, or the like, for example bichromated gelatine, polyvinylcarbazole, etc.

The present invention can provide a color image reading apparatus, which employs the volume hologram and the optical interference film arranged as described above as color separation means in reading a color image through the color separation means by the reading means composed of the monolithic 3-line sensor, whereby a line on manuscript can be separated into three beams to enable digital reading of color image at high precision without using redundant memories for compensating gaps between lines, which are necessary in the ordinary optical systems.

In addition, the present invention can achieve a high efficiency of color separation, which cannot be attained by other diffraction gratings, using the volume hologram with high diffraction efficiency and narrow spectral band and the dichroic film with high reflectivity and narrow spectral band, and can greatly reduce image blur caused by chromatic aberration in spectral separation in the sub-scanning direction.

Also, the color separation means can be readily produced by attaching the cover glass with optical interference film onto the volume hologram.

Further, although the hologram photosensitive material is generally inferior in mechanical strength and moisture resistance as compared to glass, it is protected by the cover glass, providing a color image reading apparatus excellent in environmental resistance.

The second embodiment is especially easy in production and excellent in yield, because the volume holograms for green light and for blue light are separately produced by respective exposure processes.

What is claimed is:

1. A color image reading apparatus comprising;
   a multiple-line sensor in which a plurality of one-dimensional sensor arrays are arranged on a single substrate;
   a projection optical system for projecting a subject on said sensor; and
   color separation means disposed in an optical path between said projection optical system and said sensor, for color-separating light from said subject into a plurality of color beams, said color separation means comprising a volume hologram and an optical interference film.

2. A color image reading apparatus according to claim 1, wherein said optical interference film is provided on a cover glass and bonded to said volume hologram.

3. A color image reading apparatus according to claim 1, wherein said color separation means separates the light from said subject into three beams of red light, green light and blue light, and wherein said green light and said blue light are separated by a diffraction effect of said volume hologram and said red light is separated by said optical interference film.

4. A color image reading apparatus according to claim 1, wherein said multiple-line sensor is a multiple-line sensor in which plural lines of one-dimensional sensor arrays are separated at finite distances from each other in a direction perpendicular to an array direction of the sensor arrays.

5. A color image reading apparatus according to claim 4, wherein said color separation means separates the light from said subject into a plurality of color beams in the direction perpendicular to said array direction.

6. A color image reading apparatus according to claim 4, wherein said subject is scanned in a sub-scanning direction perpendicular to the array direction of said sensor arrays.

7. A color image reading apparatus comprising:
   a multiple-line sensor in which a plurality of one-dimensional sensor arrays are arranged on a single substrate;
   a projection optical system for projecting a subject on said sensor; and
   color separation means disposed in an optical path between said projection optical system and said sensor, for color-separating light from said subject into three beams of red light, green light and blue light, said color separation means comprising a volume hologram and an optical interference film, wherein the color separation into the green light and the blue light is effected by a reflective diffraction by said volume hologram and said optical interference film reflects the red light only.

8. A color image reading apparatus according to claim 7, wherein said optical interference film is provided on a cover glass and bonded to said volume hologram.

9. A color image reading apparatus according to claim 7, wherein said multiple-line sensor is a multiple-line sensor in which plural lines of one-dimensional sensor arrays are separated at finite distances from each other in a direction perpendicular to an array direction of the sensor arrays.

10. A color image reading apparatus according to claim 9, wherein said color separation means separates the light from said subject into a plurality of color beams in the direction perpendicular to said array direction.

11. A color image reading apparatus according to claim 9, wherein said subject is scanned in a sub-scanning direction perpendicular to the array direction of said sensor arrays.

12. A color image reading apparatus comprising:
a multiple-line sensor in which a plurality of one-dimensional sensor arrays are arranged on a single substrate;
a projection optical system for projecting a subject on said sensor; and
color separation means disposed in an optical path between said projection optical system and said sensor, for color-separating light from said subject into a plurality of color beams, said color separation means being structured such that a substrate on which a volume hologram is formed and a substrate on which an optical interference film is formed are integrally constructed.

13. A color image reading apparatus according to claim 12, wherein said color separation means separates the light from said subject into three beams of red light, green light and blue light, and wherein said green light and said blue light are separated by a diffraction effect of said volume hologram and said red light is separated by said optical interference film.

14. A color image reading apparatus according to claim 12, wherein said multiple-line sensor is a multiple-line sensor in which plural lines of one-dimensional sensor arrays are separated at finite distances from each other in a direction perpendicular to an array direction of the sensor arrays.

15. A color image reading apparatus according to claim 14, wherein said color separation means separates the light from said subject into a plurality of color beams in the direction perpendicular to said array direction.

16. A color image reading apparatus according to claim 14, wherein said subject is scanned in a sub-scanning direction perpendicular to the array direction of said sensor arrays.

* * * * *

UNITED STATES PATENT AND TRADEMARK OFFICE
CERTIFICATE OF CORRECTION

PATENT NO. : 5,481,383
DATED : January 2, 1996
INVENTOR(S) : Morishima et al.

It is certified that error appears in the above-indentified patent and that said Letters Patent is hereby corrected as shown below:     On the title page, Item:

[56] U.S. PATENT DOCUMENTS

"Lehoreau et al." should read --Lehureau et al.--.

[56] FOREIGN PATENT DOCUMENTS

"3181269" should read --3-181269--.

COLUMN 5

Line 17, "$Z_B = L \cdot \tan \lambda_B;$" should read
--$Z_B = L \cdot \tan \gamma_B;$--.
Line 21, "$Z_G = L \cdot \tan \lambda_G.$" should read
--$Z_G = L \cdot \tan \gamma_G.$--.
Line 23, "$\lambda_B$ or $\lambda_G$" should read
--$\gamma_B$ or $\gamma_G$--.
Line 26, "$\lambda_B = +0.1637°$" should read --$\gamma_B = +0.1637°$-- and
"$\lambda_G = -0.1637°$" should read --$\gamma_G = -0.1637°$.--.

COLUMN 8

Line 7, "$t_g:$" should read --$t_G:$--.
Line 39, "$\lambda_{max}$" should read --$\eta_{max}$--.

UNITED STATES PATENT AND TRADEMARK OFFICE
CERTIFICATE OF CORRECTION

PATENT NO. : 5,481,383
DATED : January 2, 1996
INVENTOR(S) : Morishima et al.

It is certified that error appears in the above-indentified patent and that said Letters Patent is hereby corrected as shown below:

<u>COLUMN 10</u>

Line 24, "comprising;" should read --comprising:--.

Signed and Sealed this

Twenty-eighth Day of May, 1996

Attest:

BRUCE LEHMAN

*Attesting Officer*     *Commissioner of Patents and Trademarks*